United States Patent
Dong et al.

(10) Patent No.: US 11,360,675 B2
(45) Date of Patent: Jun. 14, 2022

(54) METHOD AND SYSTEM FOR IMPROVING REBUILD FOR A STORAGE SYSTEM

(71) Applicant: EMC IP Holding Company LLC, Hopkinton, MA (US)

(72) Inventors: Jibing Dong, Beijing (CN); Geng Han, Beijing (CN); Vamsi Vankamamidi, Hopkinton, MA (US); Jian Gao, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 46 days.

(21) Appl. No.: 17/085,191

(22) Filed: Oct. 30, 2020

(65) Prior Publication Data
US 2022/0137831 A1     May 5, 2022

(51) Int. Cl.
*G06F 3/06*     (2006.01)

(52) U.S. Cl.
CPC ............ *G06F 3/0619* (2013.01); *G06F 3/067* (2013.01); *G06F 3/0644* (2013.01); *G06F 3/0653* (2013.01); *G06F 3/0659* (2013.01); *G06F 3/0683* (2013.01)

(58) Field of Classification Search
CPC .... G06F 3/0619; G06F 3/0644; G06F 3/0653; G06F 3/0659; G06F 3/067; G06F 3/0683
See application file for complete search history.

(56) References Cited

U.S. PATENT DOCUMENTS

| | | | | |
|---|---|---|---|---|
| 2003/0084372 | A1* | 5/2003 | Mock | G06F 11/1471 714/E11.13 |
| 2008/0209263 | A1* | 8/2008 | Settle | G06F 11/1088 714/E11.054 |
| 2016/0154718 | A1* | 6/2016 | Chadwell | G11B 20/1883 714/6.22 |
| 2021/0405902 | A1* | 12/2021 | Sangle | G06F 3/0631 |

OTHER PUBLICATIONS

Waltz, Client-Server Communication, Sep. 11, 2020, Available at: https://wepay.github.io/waltz/docs/client-server-communication, (Year: 2020).*

* cited by examiner

*Primary Examiner* — Ryan Bertram
(74) *Attorney, Agent, or Firm* — Krishnendu Gupta; Deepika Bhayana; Derek Lam (57) ABSTRACT

A method is used in improving rebuilding in data storage. The generation number of a PLB is compared with a generation number of a partition corresponding to the PLB. The data of the PLB is rebuilt based on the comparison.

14 Claims, 9 Drawing Sheets

METHOD AND SYSTEM FOR IMPROVING REBUILD FOR A STORAGE SYSTEM

BACKGROUND

Technical Field

This application relates to improving rebuild for a data storage system.

Description of Related Art

Computer systems may include different resources used by one or more host processors. Resources and host processors in a computer system may be interconnected by one or more communication connections. These resources may include, for example, data storage devices. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

Such a data storage system typically includes processing circuitry and a set of disk drives (disk drives are also referred to herein as simply "disks" or "drives"). In general, the processing circuitry performs load and store operations on the set of disk drives on behalf of the host devices. In certain data storage systems, the disk drives of the data storage system are distributed among one or more separate disk drive enclosures (disk drive enclosures are also referred to herein as "disk arrays" or "storage arrays") and processing circuitry serves as a front-end to the disk drive enclosures. The processing circuitry presents the disk drive enclosures to the host device as a single, logical storage location and allows the host device to access the disk drives such that the individual disk drives and disk drive enclosures are transparent to the host device.

Disk arrays are typically used to provide storage space for one or more computer file systems, databases, applications, and the like. For this and other reasons, it is common for disk arrays to be structured into logical partitions of storage space, called logical units (also referred to herein as LUs or LUNs). For example, at LUN creation time, storage system may allocate storage space of various storage devices in a disk array to be presented as a logical volume for use by an external host device. This allows a disk array to appear as a collection of separate file systems, network drives, and/or volumes.

Moreover, data storage systems employ various logical structures in memory for organizing data, including logical structures such as a namespace, a mapper, virtual layer blocks (VLBs), and physical layer blocks (PLBs). A namespace is configured to organize storage objects such as LUNs and file systems, and to track logical addresses of the storage objects such as address offsets into LUNs, file system addresses, and so on. A mapper is configured to map the logical addresses of the storage objects in the namespace to virtualization spaces (also referred to herein as "virtual pointers") in the respective VLBs. For example, such a mapper may include multiple pointer arrays in a mapping hierarchy configured as a multi-level tree. Further, the lowest level of the multi-level tree may include an array of leaf pointers, each pointing to one of multiple virtual pointers in a respective VLB. Each such virtual pointer in the respective VLB is configured to point to data, such as a data block, in a respective PLB.

Additionally, data storage systems employ various techniques to assure high availability in the event of system failures. In one example, a storage device may experience a media error, in which stored data becomes corrupted and cannot be read from storage. In another example, the stored data may be tainted due to malfunction of the storage device, namely, the storage device may be writing to storage improperly and erroneously. To protect against possible data and/or metadata loss due to a physical drive failure, the data storage system can be configured such that at least some of its physical drives belong to a redundant array of independent (or inexpensive) disks (RAID) group, which is a storage device array created by logically binding a set of physical drives together. Such a RAID group can represent a logically contiguous address space distributed across a set of physical drives. Further, different RAID levels can be employed to provide varying degrees of fault tolerance for physical drive failures within the RAID group. It is noted that the terms "storage device(s)", "drive(s)", and "disk(s)" are employed herein interchangeably, even though it is well known that not all physical storage devices or drives include rotating disks.

SUMMARY OF THE INVENTION

One aspect of the current technique is a method for improving rebuild for a storage system. The method includes comparing a generation number of a PLB with a generation number of a partition corresponding to the PLB, and rebuilding data in the PLB based on the comparison.

Data in the PLB may be rebuilt when the generation number of the PLB is equal to a generation number of the partition corresponding to the PLB. The method may also include receiving a write request pertaining to the PLB when a storage device corresponding to the PLB is unavailable; obtaining the generation number of the partition corresponding to the PLB; and setting the generation number of the PLB to the generation number of the partition corresponding to the PLB.

The generation number of the PLB may be stored in a PLB descriptor. An indicator that data in the PLB is invalid may be set. The generation number of the PLB stored in the PLB descriptor may be compared to the generation number of the partition.

The method may also include completing a rebuild cycle of the partition corresponding to the PLB, and incrementing the generation number of the partition.

Another aspect of the current technique is a system, with a processor, for improving rebuild in a storage system. The processor is configured to compare a generation number of a PLB with a generation number of a partition corresponding to the PLB. The processor is also configured to rebuild data in the PLB based on the comparison. The processor may be configured to perform any other processes in conformance with the aspect of the current techniques described above.

BRIEF DESCRIPTION OF THE DRAWINGS

Features and advantages of the present technique will become more apparent from the following detailed description of exemplary embodiments thereof taken in conjunction with the accompanying drawings in which.

DETAILED DESCRIPTION OF EMBODIMENT(S)

Described below is a technique for improving rebuild for a storage system, which technique may be used to provide, among other things, comparing a generation number of a PLB with a generation number of a partition corresponding to the PLB, and rebuilding data in the PLB based on the comparison.

During a storage system's operation, one or more drives of a storage device may become inaccessible. For example, a storage device may be taken off-line to have its firmware upgraded. In another example, a storage device may fail so as to require replacement. While the storage device is offline, the storage system may still receive write requests that would be applied to the data on the storage device. Consequently, when the storage drive becomes accessible again, its contents need to be rebuilt.

The type of rebuild may depend on the amount of time the storage device was unavailable. If that time exceeds a threshold, such as 5.0 minutes, the storage device is assumed to be degraded and its data invalid. Thus, the storage system will perform a full rebuild. However, if the time is below the threshold, then the data on the storage device is presumed to remain valid, except for the changes to the data reflected in write requests received while the storage device was unavailable. In such situations, the storage system performs an incremental rebuild.

Incremental rebuilds require granular knowledge of the data on a storage device. Since such rebuilds must distinguish between PLBs with valid data and those without, the storage system accesses metadata to discern the validity of the PLBs' data. Such metadata for each PLB is often stored in its corresponding VLB, but accessing the VLBs for an entire storage device, or even one drive of a storage device, can consume significant computing resources.

In at least some implementations in accordance with the techniques as described herein, the techniques for improving rebuild in storage systems can provide one or more of the following advantages: significant reduction in processing time for rebuild cycles.

Figure 1:
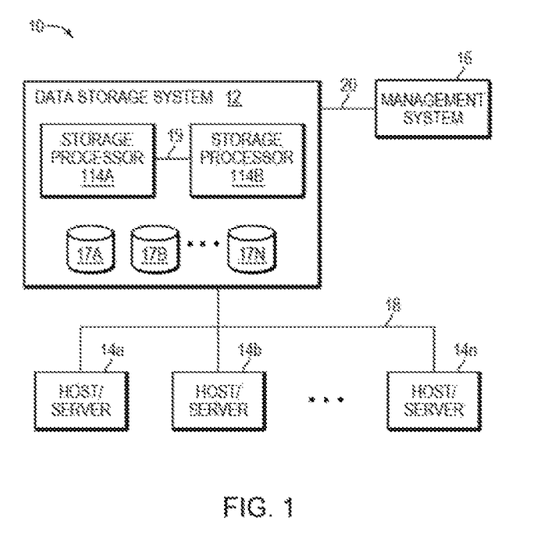
FIG. 1 depicts an exemplary embodiment of a computer system that may utilize the techniques described herein.

FIG. 1 depicts an example embodiment of a computer system 10 that may be used in connection with performing the techniques described herein. The system 10 includes one or more data storage systems 12 connected to server or hosts 14a-14n through communication medium 18. The system 10 also includes a management system 16 connected to one or more data storage systems 12 through communication medium 20. In this embodiment of the system 10, the management system 16, and the N servers or hosts 14a-14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 20 may be a network connection, bus, and/or other type of data link, such as a hardwire or other connections known in the art. For example, the communication medium 18 may be the Internet, an intranet, network or other wireless or other hardwired connection(s) by which the hosts 14a-14n may access and communicate with the data storage systems 12, and may also communicate with other components (not shown) that may be included in the system 10. In one embodiment, the communication medium 20 may be a LAN connection and the communication medium 18 may be an iSCSI, Fibre Channel, Serial Attached SCSI, or Fibre Channel over Ethernet connection.

Each of the hosts 14a-14n and the data storage systems 12 included in the system 10 may be connected to the communication medium 18 by any one of a variety of connections as may be provided and supported in accordance with the type of communication medium 18. Similarly, the management system 16 may be connected to the communication medium 20 by any one of variety of connections in accordance with the type of communication medium 20. The processors included in the hosts 14a-14n and management system 16 may be any one of a variety of proprietary or commercially available single or multi-processor system, or other type of commercially available processor able to support traffic in accordance with any embodiments described herein.

It should be noted that the particular examples of the hardware and software that may be included in the data storage systems 12 are described herein in more detail, and may vary with each particular embodiment. Each of the hosts 14a-14n, the management system 16 and data storage systems 12 may all be located at the same physical site, or, alternatively, may also be located in different physical locations. In connection with communication mediums 18 and 20, a variety of different communication protocols may be used such as SCSI, Fibre Channel, iSCSI, and the like. Some or all of the connections by which the hosts 14a-14n, management system 16, and data storage systems 12 may be connected to their respective communication medium 18, 20 may pass through other communication devices, such as switching equipment that may exist such as a phone line, a repeater, a multiplexer or even a satellite. In one embodiment, the hosts 14a-14n may communicate with the data storage systems 12 over an iSCSI or a Fibre Channel connection and the management system 16 may communicate with the data storage systems 12 over a separate network connection using TCP/IP. It should be noted that although FIG. 1 illustrates communications between the hosts 14a-14n and data storage systems 12 being over a first communication medium 18, and communications between the management system 16 and the data storage systems 12 being over a second different communication medium 20, other embodiments may use the same connection. The particular type and number of communication mediums and/or connections may vary in accordance with particulars of each embodiment.

Each of the hosts 14a-14n may perform different types of data operations in accordance with different types of tasks. In the embodiment of FIG. 1, any one of the hosts 14a-14n may issue a data request to the data storage systems 12 to perform a data operation. For example, an application executing on one of the hosts 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. The management system 16 may, for example, display information about a current storage volume configuration, provision resources for a data storage system 12, and the like.

Each of the data storage systems 12 may include one or more data storage devices 17a-17n. Unless noted otherwise, data storage devices 17a-17n may be used interchangeably herein to refer to hard disk drive, solid state drives, and/or other known storage devices. One or more data storage devices 17a-17n may be manufactured by one or more different vendors. Each of the data storage systems included in 12 may be inter-connected (not shown). Additionally, the data storage systems 12 may also be connected to the hosts 14a-14n through any one or more communication connections that may vary with each particular embodiment. The type of communication connection used may vary with certain system parameters and requirements, such as those related to bandwidth and throughput required in accordance with a rate of I/O requests as may be issued by the hosts 14a-14n, for example, to the data storage systems 12. It should be noted that each of the data storage systems 12 may operate stand-alone, or may also be included as part of a storage area network (SAN) that includes, for example, other components such as other data storage systems 12. The particular data storage systems 12 and examples as described herein for purposes of illustration should not be construed as a limitation. Other types of commercially available data storage systems 12, as well as processors and hardware controlling access to these particular devices, may also be included in an embodiment.

In such an embodiment in which element 12 of FIG. 1 is implemented using one or more data storage systems 12, each of the data storage systems 12 may include code thereon for performing the techniques as described herein.

Servers or hosts, such as 14a-14n, provide data and access control information through channels on the communication medium 18 to the data storage systems 12, and the data storage systems 12 may also provide data to the host systems 14a-14n also through the channels 18. The hosts 14a-14n may not address the disk drives of the data storage systems 12 directly, but rather access to data may be provided to one or more hosts 14a-14n from what the hosts 14a-14n view as a plurality of logical devices or logical volumes (LVs). The LVs may or may not correspond to the actual disk drives. For example, one or more LVs may reside on a single physical disk drive. Data in a single data storage system 12 may be accessed by multiple hosts 14a-14n allowing the hosts 14a-14n to share the data residing therein. An LV or LUN (logical unit number) may be used to refer to the foregoing logically defined devices or volumes.

The data storage system 12 may be a single unitary data storage system, such as single data storage array, including two storage processors 114A, 114B or computer processing units. Techniques herein may be more generally use in connection with any one or more data storage system 12 each including a different number of storage processors 114 than as illustrated herein. The data storage system 12 may include a data storage array 116, including a plurality of data storage devices 17a-17n and two storage processors 114A, 114B. The storage processors 114A, 114B may include a central processing unit (CPU) and memory and ports (not shown) for communicating with one or more hosts 14a-14n. The storage processors 114A, 114B may be communicatively coupled via a communication medium such as storage processor bus 19. The storage processors 114A, 114B may be included in the data storage system 12 for processing requests and commands. In connection with performing techniques herein, an embodiment of the data storage system 12 may include multiple storage processors 114 including more than two storage processors as described. Additionally, the two storage processors 114A, 114B may be used in connection with failover processing when communicating with the management system 16. Client software on the management system 16 may be used in connection with performing data storage system management by issuing commands to the data storage system 12 and/or receiving responses from the data storage system 12 over connection 20. In one embodiment, the management system 16 may be a laptop or desktop computer system.

The particular data storage system 12 as described in this embodiment, or a particular device thereof, such as a disk, should not be construed as a limitation. Other types of commercially available data storage systems 12, as well as processors and hardware controlling access to these particular devices, may also be included in an embodiment.

In some arrangements, the data storage system 12 provides block-based storage by storing the data in blocks of logical storage units (LUNs) or volumes and addressing the blocks using logical block addresses (LBAs). In other arrangements, the data storage system 12 provides file-based storage by storing data as files of a file system and locating file data using inode structures. In yet other arrangements, the data storage system 12 stores LUNs and file systems, stores file systems within LUNs, and so on.

The two storage processors 114A, 114B (also referred to herein as "SP") may control the operation of the data storage system 12. The processors may be configured to process requests as may be received from the hosts 14a-14n, other data storage systems 12, management system 16, and other components connected thereto. Each of the storage processors 114A, 114B may process received requests and operate independently and concurrently with respect to the other processor. With respect to data storage management requests, operations, and the like, as may be received from a client, such as the management system 16 of FIG. 1 in connection with the techniques herein, the client may interact with a designated one of the two storage processors 114A, 114B. Upon the occurrence of failure of one the storage processors 114A, 114B, the other remaining storage processors 114A, 114B may handle all processing typically performed by both storage processors 114A.

Figure 2:
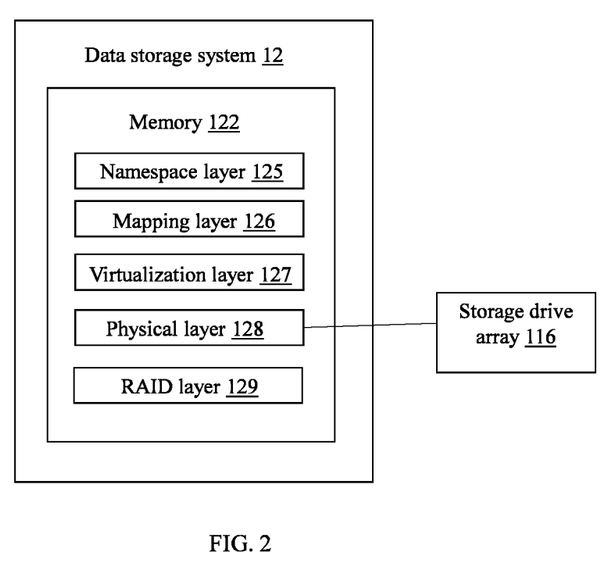
FIG. 2 depicts an exemplary embodiment of a data storage system used in the computer system of FIG. 1.

FIG. 2 depicts an exemplary embodiment of a data storage system 12 used in the computer system 10 of FIG. 1. In addition to the storage processors 114A, 114B and data storage devices 17a-17n depicted in FIG. 1, the data storage system 12 can include a memory 122. The memory 122 can include persistent memory (e.g., flash memory, magnetic memory) and non-persistent memory (e.g., dynamic random access memory (DRAM), static random access memory (SRAM)), and can accommodate a variety of specialized software constructs, including, but not limited to, a namespace layer 125, a mapping layer 126, a virtualization layer 127, a physical layer 128, a RAID layer 129, and/or any other suitable software constructs.

The namespace layer 125 is a logical structure configured to organize storage objects such as VVOLs, LUNs, file systems, and/or any other suitable storage objects, accessible to the plurality of hosts 14a-14n. The namespace layer 125 can track logical addresses of storage objects, such as offsets into LUNs or file system addresses. For example, if a LUN made up of one or more extents were to have a maximum size of 10 gigabytes (Gb), then the namespace layer 125 may provide a 10 Gb logical address range to accommodate the LUN.

The mapping layer 126 is a logical structure configured to map the logical addresses of the storage objects in the namespace layer 125 to virtualization structures (also referred to herein as "virtual pointers") in the virtualization layer 127. To that end, the mapping layer 126 can include multiple pointer arrays (e.g., indirect pointer arrays) in a mapping hierarchy configured as a multi-level tree. For example, such a pointer array may include a pointer to a child pointer array, and may be pointed to by a pointer in a parent pointer array.

The virtualization layer 127 is a logical structure configured to provide block virtualization. For example, the virtualization layer 127 may have an aggregation of virtual layer blocks (VLBs), each of which may include a plurality of virtual pointers (e.g., 512 virtual pointers). Further, the lowest level of the multi-level tree in the mapping layer 126 may include an array of leaf pointers, each of which may point to one of the virtual pointers included in a respective VLB of the virtualization layer 127.

The physical layer 128 is configured to store an aggregation of physical layer blocks (PLBs). For example, such a PLB may include an aggregation of compressed data blocks, individually compressed data blocks, and/or uncompressed data blocks. Further, each virtual pointer included in a respective VLB of the virtualization layer 127 may point to a data block in a respective PLB of the physical layer 128. It is noted that, although the physical layer 128 is described herein using the term "physical", an underlying storage drive array 116 is typically responsible for the actual, physical storage of host data. The storage drive array 116 can include the storage devices 17a-17n depicted in FIG. 1. The storage drive array 116 may include magnetic disk drives, electronic flash drives, optical drives, and/or any other suitable physical drives. The storage drive array 116 can be attached to one or more I/O channels of the data storage system 12, while also being accessible over the network 18.

In this embodiment, the RAID layer 129 is configured to organize the physical drives of the storage drive array 116 as one or more RAID groups, in which data can be written as RAID stripes across at least some of the physical drives. Although the embodiment of the data storage system 12 depicted in FIG. 2 includes RAID layer 129, in other embodiments, the data storage system 12 may omit this layer 129.

Figure 3:
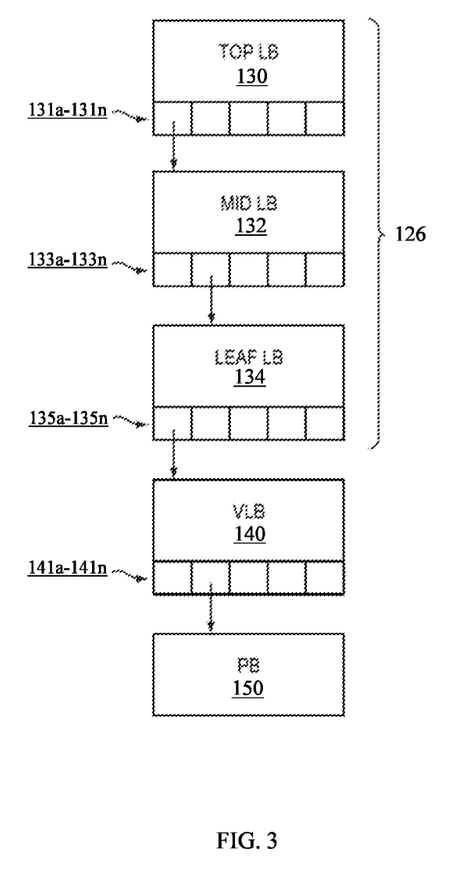
FIG. 3 is an exemplary block diagram depicting the mapping layer, virtualization layer, and physical layer used in the data storage system of FIG. 2.

FIG. 3 is an exemplary block diagram depicting the mapping layer 126, virtualization layer 127, and physical layer 128 used in the data storage system 12 of FIG. 2. In this embodiment, the mapping layer 126 includes a collection of logical blocks organized in a tree structure with three levels: the top-level logical blocks (top LBs) 130, the mid-level logical blocks (mid LBs) 132, and the leaf logical blocks (leaf LBs) 134. Various embodiments of the mapping layer 126 may include tree structures with other numbers of levels, such as a two-level tree, or a flat table that maps logical locations with physical locations.

In some embodiments, a top LB 130 has one or more pointers 131a-n associated with it. In some embodiments the one or more pointers 131a-n are located within the top LB 130 at indices, whereby each of the one or more pointers 131a-n is located at a different index within the top LB 110. In some embodiments, the one or more pointers 131a-n each point to a mid LB 132.

In some embodiments, each mid LB 111320 has one or more pointers 133a-n associated with it. In some embodiments the one or more pointers 133a-n are located within each of the respective one or more mid LBs 132 at indices, whereby each of the one or more pointers 133a-n is located at a different index within each of the respective one or more mid LBs 132. In some embodiments, the one or more pointers 133a-n each point to a leaf LB 134.

In some embodiments, each leaf LB 134 has one or more pointers 135a-n associated with it. In some embodiments, the one or more pointers 135a-n are located within each of the respective one or more leaf LBs 134 at indices, whereby each of the one or more pointers 135a-n is located at a different index within each of the respective one or more leaf LBs 134. In some embodiments, the one or more pointers 135a-n each point to a virtual block (VLB) 140.

Although the embodiment in FIG. 3 depicts logical blocks organized in a three-level tree structure, in various embodiments, the tree structure may have other numbers of levels that are organized and described according to other schema. For example, a four-level tree may include super blocks, which point to top indirect blocks. Top indirect blocks may point to mid indirect blocks, and mid indirect blocks may point to leaf indirect blocks. Finally, the leaf indirect blocks may point to virtual blocks VLB 40.

In some embodiments, each VLB 140 has one or more pointers 141a-n associated with it. In some embodiments, the one or more pointers 141a-n are located within each of the respective one or more VLBs 140 at indices, whereby each of the one or more pointers 141a-n is located at a different index within each of the respective one or more VLBs 140. In some embodiments, the one or more pointers 141a-n each point to a block (PB) 150 in physical storage.

In some embodiments, the pointers 131a-n, 133a-n, 135a-n, and 141a-n are a combination of an address of the block pointed to and an index within the pointed-to block. In some embodiments, the address of the block pointed to and the index within the pointed-to block are encoded into a single value. In some embodiments, the address of the block pointed-to and the index within the pointed-to block are stored as separate values and used together or combined when needed (e.g., when locating the actual contents at the specific location being referenced). In this way, the mapping layer 126, virtualization layer 127, and physical layer 128 can be traversed by following the pointers.

Figure 4:
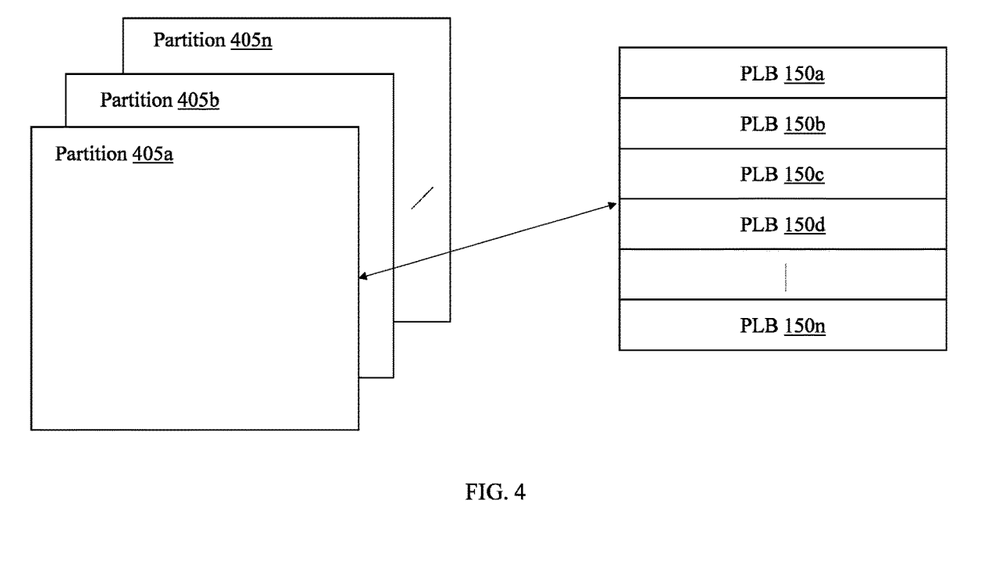
FIG. 4 is an exemplary block diagram depicting the division of the physical layer used in the data storage system of FIG. 2 into partitions.

FIG. 4 is an exemplary schematic diagram depicting the organization of the physical layer 128 of a storage device 17 used in the data storage system 12 of FIG. 2. In this embodiment, the physical layer 128 can be divided into partitions 405a, 405b . . . 405n (collectively "405"), each of which includes the same number of PLBs 150. The partitions 405 can be distributed across the drives of one or more storage devices 17. As a result, when one drive becomes unavailable, only a subset of the partitions 405 may be impacted, while the remaining partitions 405 continue operating.

Figure 5:
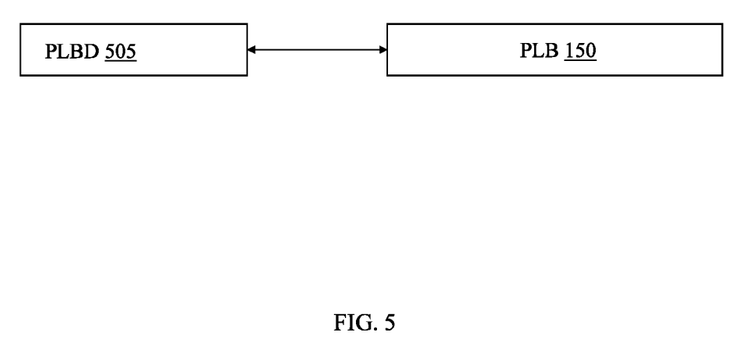
FIG. 5 is an exemplary block diagram depicting metadata describing a single PLB used in the data storage system of FIG. 2.

FIG. 5 is an exemplary schematic diagram depicting the relationship between a PLB 150 used in the data storage system 12 of FIG. 2 and a PLB descriptor (PLBD) 505 that stores metadata about the PLB 150. The operation of the PLBD 505 will be described in more detail below.

The storage system 12 can use multiple variables to track the states of the partitions 405 and the individual PLBs 150 therein. The following list includes exemplary variables pertaining to the partition 405:
partition→needs_rebuild
partition_generation_number
rl_bitmap
rb_bitmap
new_disk_bitmap The names of the variables are used herein for clarity and convenience. Any of the variables may be renamed, as would be appreciated by one of ordinary skill in the art. In many embodiments, these variables may be stored as metadata.

In many embodiments, partition→needs_rebuild indicates whether a partition 405 would require rebuilding. The variable may be reset when the partition 405 is first allocated. Should the storage system 12 receives a write request for data in the partition 405 when an associated drive is unavailable, the storage system 12 may set partition→needs_rebuild. Thus, when the drive becomes available again, the storage system 12 may use partition→needs_rebuild to determine whether the partition 405 needs to be rebuilt. If the variable has not been set, the data within the partition 405 is presumed to be valid. However, if the variable has been set, the storage system 12 rebuilds the data in the partition 405. After the rebuild has been completed, partition→needs rebuild may be reset.

Furthermore, partition_generation_number may indicate the number of rebuild cycles that the partition 405 has undergone. The variable may be set to zero (0) when the partition 405 is first allocated. Each time the partition 405 is rebuilt, whether in full or incrementally, the variable is increased. The variable may be incremented only after a rebuild cycle has been successfully completed.

In some embodiments, rl_bitmap indicates whether a drive, or portion of a drive (e.g., storage slice on the drive) is valid such that the data therein may be accessed. If rl_bitmap is set, then the drive cannot be accessed. In some embodiments, rl_bitmap includes one bit for every drive in a storage array, such as RAID. For example, in a RAID 4+1 system, rl_bitmap may be "00000" when all of the drives are valid for access. If the first drive becomes inaccessible, rl_bitmap may become "10000", for example.

In many embodiments, rb_bitmap indicates whether a drive, or portion of a drive, is inaccessible due to a rebuild. For example, if the first three drives of a RAID 4+1 system are being rebuilt, rb_bitmap may be "11100", and data for any partition 405 on those drives may be inaccessible. When a rebuild completes for a drive, its corresponding bit in rb_bitmap may be reset.

In various embodiments, new_disk_bitmap indicates whether a drive or portion of a drive has been fully replaced.

The following list includes exemplary variables pertaining to individual PLBs 150:
degraded_bitmap
PLB_generation_number In many embodiments, degraded_bitmap indicates whether data in the PLB 150 is valid. This variable may be stored in a VLB 140 corresponding to the PLB 150. When the storage system 12 receives a write request for the PLB 150, the degraded_bitmap may be set. In this manner, degraded_bitmap indicates whether the PLB 150 has valid data. If the PLB 150 does not have valid data, the PLB 150 would need to be rebuilt when its associated drive becomes accessible. When the storage system 12 successfully rebuilds the data in the PLB 150, the storage system 12 resets degraded_bitmap to indicate the data therein is valid. Furthermore, if the PLB 150 does not have valid data, it cannot service a read request. The storage system 12 would recover the data from other positions in storage, i.e., other drives in a RAID storage system.

In various embodiments, the PLB_generation number indicates the generation of the partition 405 during which the most recent write request arrived. Thus, when the storage system 12 receives a write request for a partition 405, in addition to setting degraded_bitmap for the PLB 150 to indicate that its data is no longer valid, PLB_generation_number is set to partition_generation_number. This variable may be stored in a VLB 140 corresponding to the PLB 150.

In many embodiments, when the storage system 12 receives a write request, in addition to storing degraded_bitmap and PLB_generation_number in a VLB 140 corresponding to the affected PLB 150, the storage system may store the variables in a PLB descriptor (PLBD). The PLBD is stored as metadata in memory.

Figure 6A:
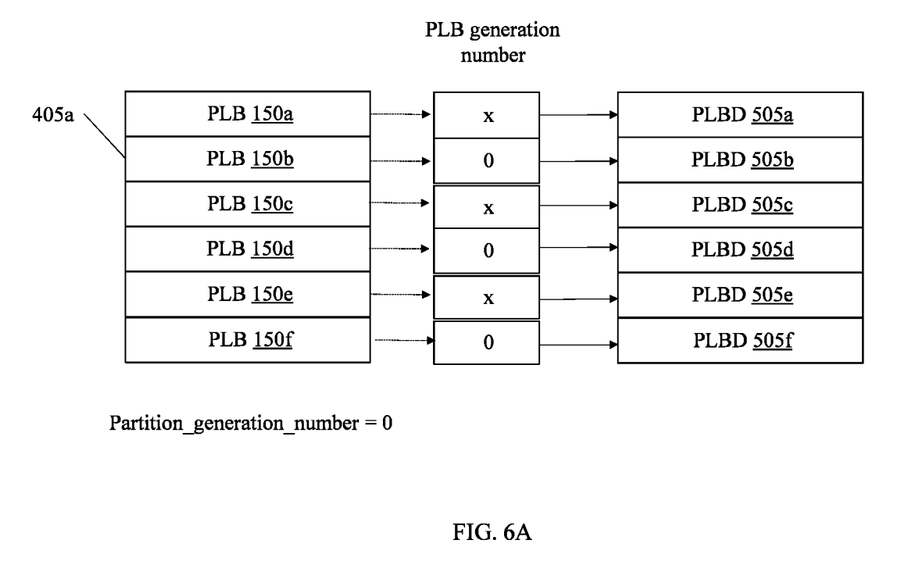
FIGS. 6A-6C are schematic diagrams illustrating an example of the techniques for improving rebuild.
Figure 6B:
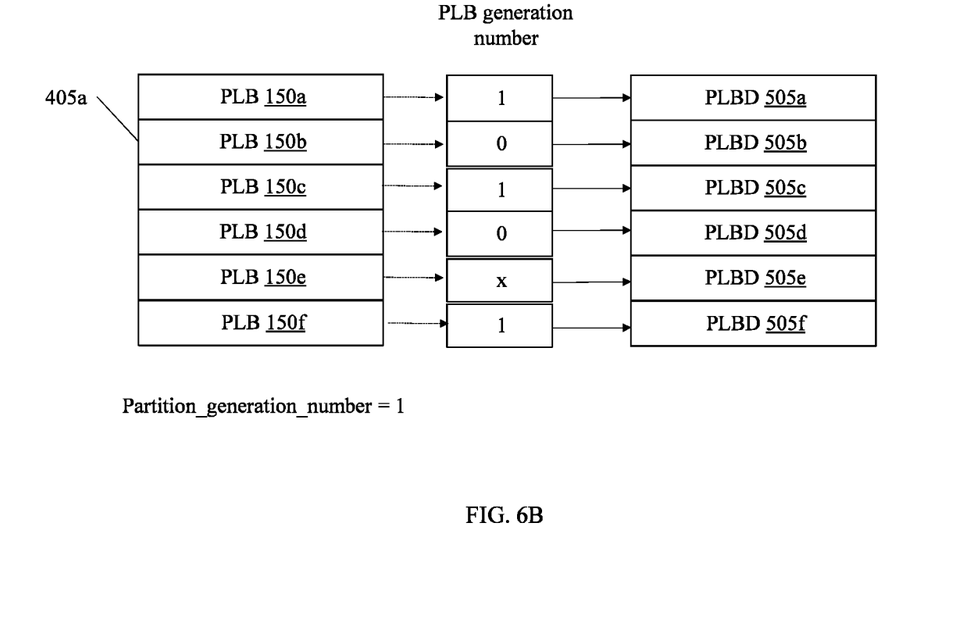
Figure 6C:
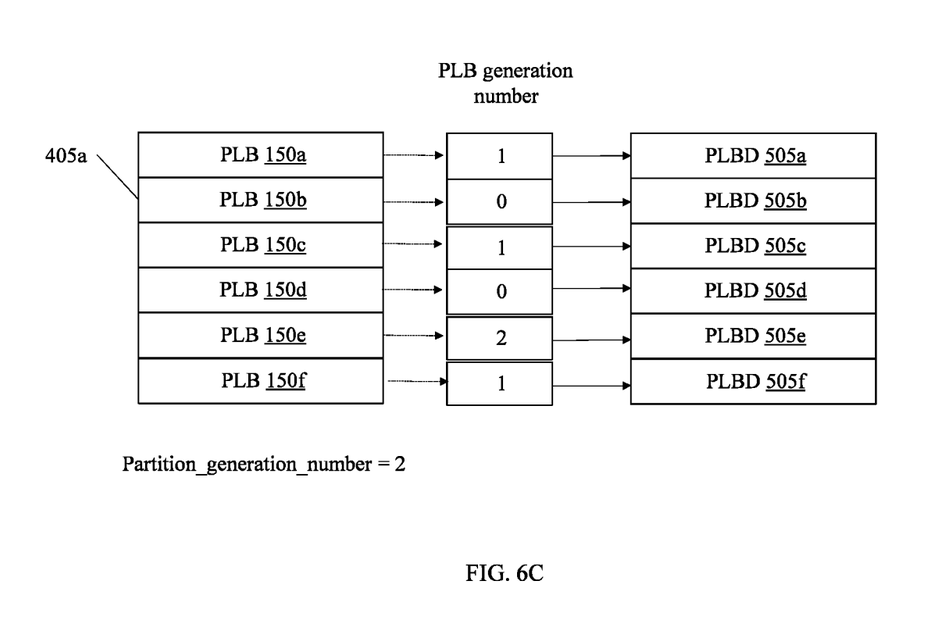

FIGS. 6A-6C are schematic diagrams illustrating an example of the techniques for improving rebuild. FIG. 6A depicts a partition 405a before any rebuilds; thus, its generation number is zero (0). Suppose the drive associated with the partition 405a becomes unavailable. The storage system 12 receives a write request directed to PLB 105b. Because this is the first write request impacting the partition 405a, the storage system 12 sets partition→needs_rebuild to indicate that at least some data on the partition 405a is no longer valid.

The storage system 12 also sets PLB_generation_number for PLB 105b. The storage system 12 obtains the generation of the partition (in this case, "0"), and sets the PLB_generation_number for PLB 105b, accordingly. This value for PLB_generation_number is stored in the PLBD 505d for PLB 105b, as well as the VLB 140 for PLB 105b. The same steps are performed for write requests directed to PLBs 105d and 105f. In some embodiments, the degraded_bitmap for the PLBs 105b, 105d, and 105f are set and stored in the PLBDs 505b, 505d, and 505f and VLBs 140, as well.

When the drive associated with the partition 405a becomes available again, the storage system 12 examines the value of partition→needs_rebuild. Because this variable has been set, the partition 405a needs to be rebuilt. The storage system 12 loads the PLBDs 505 and compares the generation number of each PLB 150 to the generation number of the partition 405a. As the generation numbers of PLBs 105b, 105d, 105f match that of the partition 405a, write requests for those PLBs 150 arrived when the drive was inaccessible, and thus, the corresponding data is invalid. Thus, the storage system 12 rebuilds the PLBs 105b, 105d, 105*f*. In some embodiments, the PLBs 105*b*, 105*d*, and 105*f* are rebuilt only if their respective degraded_bitmap variables have been set, which confirms that the storage system 12 has received write requests for the PLBs. When the rebuild cycle for the partition 405*a* has been completed, the generation of the partition number is incremented to one (1). Furthermore, partition→needs_rebuild for the partition 405*a* is reset.

Suppose the drive for the partition 405*a* becomes unavailable again, and the storage system 12 receives write requests for PLBs 105*a*, 105*c*, and 105*f*. In response to the first write request received, the storage system 12 sets partition→needs_rebuild. For each write request, the storage system 12 obtains the generation of the partition (in this case, "1"), and sets the PLB_generation_numbers for the applicable PLB 105*a*, 105*c*, and 105*f*. The generation numbers for the PLBs 105*a*, 105*c*, and 105*f* are stored in the in the corresponding PLBDs 505*a*, 505*c*, and 505*f* and VLBs 140, as depicted in FIG. 6B. In some embodiments, the degraded_bitmap for the PLBs 105*a*, 105*c*, and 105*f* are set and stored in the PLBDs 505*a*, 505*c*, and 505*f* and VLBs 140, as well.

When the drive associated with the partition 405*a* becomes available again, the storage system 12 examines the value of partition→needs_rebuild. Because this variable has been set, the partition 405*a* needs to be rebuilt. The storage system 12 loads the PLBDs 505 and compares the generation number of each PLB 150 to the generation number of the partition 405*a*.

For PLBs 150*b* and 150*d*, the generation number of the PLBs (0) is less than the generation number of the partition 405*a* (1). Because the data has not been altered since the last rebuild, the data is presumed to be valid. Consequently, these PLBs 150*b* and 150*d* are not rebuilt.

However, the generation numbers of PLBs 105*a*, 105*c*, and 105*f* is equal to the generation number of the partition 405*a*. Thus write requests for those PLBs 150 arrived when the drive was inaccessible but before the last rebuild. As a result, the data is invalid, and PLBs 105*a*, 105*c*, and 105*f* are rebuilt. In some embodiments, the PLBs 105*a*, 105*c*, and 105*f* are rebuilt only if their respective degraded_bitmap variables have been set, which confirms that the storage system 12 has received write requests for the PLBs 105*a*, 105*c*, and 105*f*. When the rebuild cycle for the partition 405*a* has been completed, the generation of the partition number is again incremented, from one (1) to two (2), and partition→needs_rebuild for the partition 405*a* is reset.

In a further example, the drive for the partition 405*a* becomes unavailable again, but remains unavailable longer than the threshold for incremental rebuild. During this time, the storage system 12 receives a write request for PLB 105*e*. This request triggers setting of partition→needs_rebuild. Moreover, the storage system 12 obtains the generation of the partition (in this case, "2"), and sets the PLB_generation number for the PLB 105*e*, which is stored in PLBDs 505*e* and its VLB 140. The degraded_bitmap for the PLB 105*e* is set and stored in PLBD 505*e* and VLBs 140, as well.

However, because the drive remains unavailable for a period longer than the threshold for incremental rebuild, the storage system 12 executes a full rebuild. In some embodiments, the storage system 12 does not access any of the variables regarding the status of the partition 405 or the PLBs 150, as all data on the drive is presumed to be invalid. Alternatively, the storage system 12 evaluates values of degraded_bitmap stored in the PLBDs 505 to determine which PLBs 150 still have valid data. The storage system 12 replaces the problematic drive with a new one, and recovers data from other drives in redundant storage (i.e., RAID).

After completing the rebuild cycle, the storage system 12 increments the generation number of the partition 405*a* and clears all degraded_bitmap variables from the VLBs 140 and PLBDs 505.

When the storage system 12 receives a read request, the storage system 12 accesses the VLB 140 corresponding to the PLB 150 of the request and obtains its PLB generation number. If the PLB generation number is less than the generation of the partition 405*a*, the PLB 150 did not need to be altered during the most recent rebuild cycle and its data is presumed to be valid. The values for rl_bitmap and new_disk_bitmap indicate whether the drive itself is valid. If so, the data is read from the drive, and otherwise, the data is recovered from other positions within redundant storage.

If the PLB generation number is equal to the generation of the partition 405*a*, then the value for degraded_bitmap is valid. If any of degraded_bitmap, rl_bitmap, and new_disk_bitmap are set, the data is recovered from other positions within redundant storage. Otherwise, the data is read from the drive.

Figure 7:
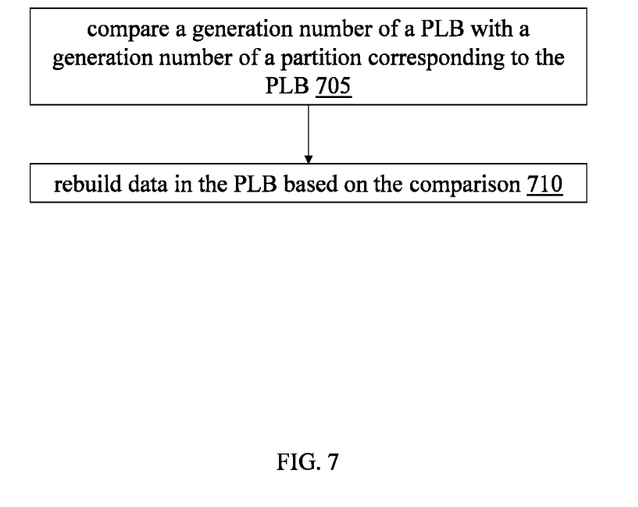
FIG. 7 is an exemplary flow diagram of a method for ensuring data integrity in a data storage system, according to techniques described herein.

FIG. 7 is an exemplary flow diagram 700 of a method for improving write rebuild in a data storage system 12. The data storage system compares a generation number of a PLB with a generation number of a partition corresponding to the PLB (step 705). The data storage system rebuilds data in the PLB based on the comparison (step 710).

It should again be emphasized that the implementations described above are provided by way of illustration, and should not be construed as limiting the present invention to any specific embodiment or group of embodiments. For example, the invention can be implemented in other types of systems, using different arrangements of processing devices and processing operations. Also, message formats and communication protocols utilized may be varied in alternative embodiments. Moreover, various simplifying assumptions made above in the course of describing the illustrative embodiments should also be viewed as exemplary rather than as requirements or limitations of the invention. Numerous alternative embodiments within the scope of the appended claims will be readily apparent to those skilled in the art.

Furthermore, as will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for improving rebuild in a storage system, the method comprising: comparing a generation number of a physical layer block (PLB) with a generation number of a partition 5 corresponding to the PLB; and rebuilding data in the PLB based on the comparison.

2. The method of claim 1, wherein rebuilding data in the PLB based on the comparison comprises:
   rebuilding data in the PLB when the generation number of the PLB is equal to a generation number of the partition corresponding to the PLB.

3. The method of claim 1, further comprising:
   receiving a write request pertaining to the PLB when a storage device corresponding to the PLB is unavailable;
   obtaining the generation number of the partition corresponding to the PLB; and
   setting the generation number of the PLB to the generation number of the partition corresponding to the PLB.

4. The method of claim 3, further comprising:
   storing the generation number of the PLB to a PLB descriptor.

5. The method of claim 3, further comprising:
   setting an indicator that data in the PLB is invalid.

6. The method of claim 3, wherein comparing the generation number of the PLB with the generation number of the partition corresponding to the PLB comprises:
   comparing the generation number of the PLB stored in the PLB descriptor to the generation number of the partition.

7. The method of claim 1, further comprising:
   completing a rebuild cycle of the partition corresponding to the PLB; and
   incrementing the generation number of the partition.

8. A system for improving rebuild in a storage system, the system including a processor configured to: compare a generation number of a physical layer block (PLB) with a generation number of a partition corresponding to the PLB; and rebuild data in the PLB based on the comparison.

9. The system of claim 8, wherein the processor is further configured to:
   rebuild data in the PLB when the generation number of the PLB is equal to a generation number of the partition corresponding to the PLB.

10. The system of claim 8, wherein the processor is further configured to:
    receive a write request pertaining to the PLB when a storage device corresponding to the PLB is unavailable;
    obtain the generation number of the partition corresponding to the PLB; and
    set the generation number of the PLB to the generation number of the partition corresponding to the PLB.

11. The system of claim 10, wherein the processor is further configured to:
    store the generation number of the PLB to a PLB descriptor.

12. The system of claim 10, wherein the processor is further configured to:
    set an indicator that data in the PLB is invalid.

13. The system of claim 10, wherein the processor is further configured to:
    compare the generation number of the PLB stored in the PLB descriptor to the generation number of the partition.

14. The system of claim 8, wherein the processor is further configured to:
    completing a rebuild cycle of the partition corresponding to the PLB; and
    incrementing the generation number of the partition.

* * * * *